United States Patent
Takata et al.

(10) Patent No.: US 11,772,183 B2
(45) Date of Patent: Oct. 3, 2023

(54) PLASMA CUTTING MACHINE AND METHOD FOR CONTROLLING PLASMA CUTTING MACHINE

(71) Applicant: KOMATSU INDUSTRIES CORPORATION, Kanazawa (JP)

(72) Inventors: Nobuhiro Takata, Kanazawa (JP); Yoshihiro Yamaguchi, Kanazawa (JP)

(73) Assignee: KOMATSU INDUSTRIES CORPORATION, Ishikawa (JP)

( * ) Notice: Subject to any disclaimer, the term of this patent is extended or adjusted under 35 U.S.C. 154(b) by 593 days.

(21) Appl. No.: 16/912,923

(22) Filed: Jun. 26, 2020

(65) Prior Publication Data

US 2021/0053141 A1    Feb. 25, 2021

(30) Foreign Application Priority Data

Aug. 19, 2019   (JP) .................. 2019-149601

(51) Int. Cl.
| | |
|---|---|
| B23K 10/00 | (2006.01) |
| B23K 37/04 | (2006.01) |
| B23K 37/02 | (2006.01) |
| G05B 19/402 | (2006.01) |
| B23K 31/10 | (2006.01) |
| H05H 1/34 | (2006.01) |
| B23K 101/18 | (2006.01) |

(52) U.S. Cl.
CPC ............ *B23K 10/006* (2013.01); *B23K 10/00* (2013.01); *B23K 31/10* (2013.01); *B23K 37/0288* (2013.01); *B23K 37/0461* (2013.01); *G05B 19/402* (2013.01); *H05H 1/34* (2013.01); *B23K 2101/18* (2018.08); *G05B 2219/37087* (2013.01)

(58) Field of Classification Search
CPC ...... B23K 10/006; B23K 10/00; B23K 31/10; B23K 37/0288; B23K 37/0461; B23K 2101/18; G05B 19/402; G05B 2219/37087; H05H 1/34
USPC ..................................................... 219/121.44
See application file for complete search history.

(56) References Cited

U.S. PATENT DOCUMENTS 5,326,955 A * 7/1994 Nishi .................. B23K 10/006
219/121.57
5,521,350 A * 5/1996 Nishi .................... B23K 9/287
219/130.01

(Continued)

FOREIGN PATENT DOCUMENTS

| JP | 2000-351076 A | 12/2000 |
| JP | 2013-202676 A | 10/2013 |

OTHER PUBLICATIONS

The Office Action for the corresponding Japanese application No. 2019-149601, dated Jun. 6, 2023.

*Primary Examiner* — Jimmy Chou
(74) *Attorney, Agent, or Firm* — Global IP Counselors, LLP

(57) ABSTRACT

A plasma torch moves to a piercing position. The plasma torch generates a plasma arc and starts a piercing step at the piercing position. Whether the piercing step is completed is determined based on the arc voltage. The plasma torch is held at the piercing position in the horizontal direction from the start of the piercing step until the completion of the piercing step. The plasma torch is moved in a predetermined direction including at least the horizontal direction after the piercing step is completed.

10 Claims, 6 Drawing Sheets

(56) References Cited

U.S. PATENT DOCUMENTS

| | | | | |
|---|---|---|---|---|
| 6,028,287 | A * | 2/2000 | Passage | B23K 10/006 219/121.54 |
| 6,359,251 | B1 * | 3/2002 | Picard | B23K 10/00 219/121.57 |
| 6,622,058 | B1 * | 9/2003 | Picard | B23K 10/00 700/174 |
| 6,992,262 | B2 * | 1/2006 | Matus | B23K 10/006 219/121.48 |
| 8,204,618 | B2 * | 6/2012 | Young, Jr. | B23K 31/10 700/166 |
| 2003/0080096 | A1 * | 5/2003 | Yamaguchi | B23K 37/08 219/121.44 |
| 2003/0204283 | A1 * | 10/2003 | Picard | B23K 26/032 700/166 |
| 2004/0104203 | A1 * | 6/2004 | Yamaguchi | B23K 5/22 219/121.36 |
| 2004/0129687 | A1 * | 7/2004 | Yamaguchi | B23K 10/006 219/121.39 |
| 2007/0241083 | A1 * | 10/2007 | Yamaguchi | B23K 26/0876 219/121.59 |
| 2008/0028907 | A1 * | 2/2008 | Ohnishi | B23K 37/0229 83/471.2 |
| 2008/0314875 | A1 * | 12/2008 | Yamaguchi | B23K 26/702 219/68 |
| 2013/0319978 | A1 * | 12/2013 | Wood | B23K 10/00 219/121.44 |
| 2014/0353294 | A1 * | 12/2014 | Yamaguchi | B23K 10/00 219/121.44 |
| 2018/0236588 | A1 | 8/2018 | Namburu et al. | |

\* cited by examiner

PLASMA CUTTING MACHINE AND METHOD FOR CONTROLLING PLASMA CUTTING MACHINE

CROSS-REFERENCE TO RELATED APPLICATIONS

This application claims priority to Japanese Patent Application No. 2019-149601 filed on Aug. 19, 2019, the disclosure of which is hereby incorporated herein by reference in its entirety.

BACKGROUND

Field of the Invention

The present invention relates to a plasma cutting machine and a method for controlling a plasma cutting machine.

Background Information

When cutting a material such as a steel plate by using a plasma cutting machine, a step (referred to below as a "piercing step") for opening a hole in the material with a plasma arc is performed first. In a piercing step as indicated, for example, in JP2013-202676, the plasma cutting machine moves a plasma torch above a cutting starting position and ignites the plasma arc in the plasma torch above the cutting starting position. The plasma arc penetrates the material whereby the piercing step is completed. After the piercing step is completed, the plasma cutting machine switches to a cutting step. In the cutting step, the plasma cutting machine cuts the material by moving the plasma torch along a previously programmed shape.

As indicated above, the cutting step is started after the through-hole is formed in the material with the piercing step. The reason for this is that before the through-hole is formed in the material, the molten metal (sputter) melted by the plasma arc is scattered upward. When the sputter hits the plasma torch, the plasma torch is damaged and cutting performance is reduced. As a result, in order to avoid the sputter, the plasma torch is retracted to a high position during the piercing step. After the through-hole is formed in the material, the plasma cutting machine lowers the plasma torch to a suitable height and switches to the cutting step.

SUMMARY

The plasma arc is generated by an arc discharge between the electrode of the plasma torch and the material. The current (referred to below as "arc current") for maintaining the arc discharge is supplied to the plasma torch from a plasma power source. The plasma power source adjusts the voltage (referred to below as an "arc voltage") for maintaining the arc so that an arc current that conforms to a command value is supplied to the plasma torch.

In the piercing step, after the plasma arc has pierced the material, the plasma arc is stretched whereby the arc voltage increases. In addition, after the plasma arc has pierced the material, when the plasma torch is stopped at that location, the through-hole expands due to the plasma arc. Consequently, the distance between the plasma arc and the material increases and the length of the plasma arc increases whereby the arc voltage increases further. At this time, when the arc voltage increases and surpasses the allowable voltage output of the plasma power source, the plasma arc is extinguished. When the plasma arc is extinguished, the plasma cutting machine is not able to switch to the cutting step and the processing steps may be interrupted. As a result, in order to prevent the extinguishing of the plasma arc, the plasma power source has an output capacity with reserve power.

The increase of the arc voltage when the piercing step is completed as explained above occurs during a time period that is much shorter than the cutting step. A plasma power source that has an output capacity with sufficient reserve power is used in order to prepare for the increase of the arc voltage during this short time period, and the power supply capacity is wasteful.

An object of the present disclosure is to avoid damage to the plasma torch during the piercing step and to suppress wastefulness of the power supply capacity in a plasma cutting machine.

An aspect of the present disclosure is a plasma cutting machine, the plasma cutting machine including a table, a plasma torch, a plasma power source, an actuator, a voltage sensor, and a controller. The table supports a material. The plasma torch includes an electrode. The plasma power source is connected to the plasma torch. The actuator supports the plasma torch so that the plasma torch is able to move in a horizontal direction and a vertical direction with respect to the table. The voltage sensor detects an arc voltage applied to the plasma torch from the plasma power source. The controller communicates with the plasma power source, the actuator, and the voltage sensor.

The controller is programmed to execute the following processing. The controller moves the plasma torch to a piercing position. The controller causes the plasma torch to generate a plasma arc and starts a piercing step at the piercing position. The controller determines whether the piercing step is completed based on the arc voltage. The controller holds the plasma torch at the piercing position in the horizontal direction from the start of the piercing step until the completion of the piercing step. The controller moves the plasma torch to a predetermined direction that includes at least the horizontal direction after the piercing step is completed.

A method according to another aspect of the present disclosure is a method for controlling a plasma cutting machine and includes the following processes. A first process involves moving the plasma torch to a piercing position. A second process involves causing the plasma torch to generate a plasma arc and starting a piercing step at the piercing position. A third process involves acquiring an arc voltage applied to the plasma torch. A fourth process involves determining whether the piercing step is completed based on the arc voltage. A fifth process involves holding the plasma torch at the piercing position in the horizontal direction from the start of the piercing step until the completion of the piercing step. A sixth process involves moving the plasma torch to a predetermined direction that includes at least the horizontal direction after the piercing step is completed. The names of the abovementioned processes are merely applied for facilitating the explanation and the order in which the processes are executed is not limited.

DETAILED DESCRIPTION OF EMBODIMENT(S)

Figure 1:
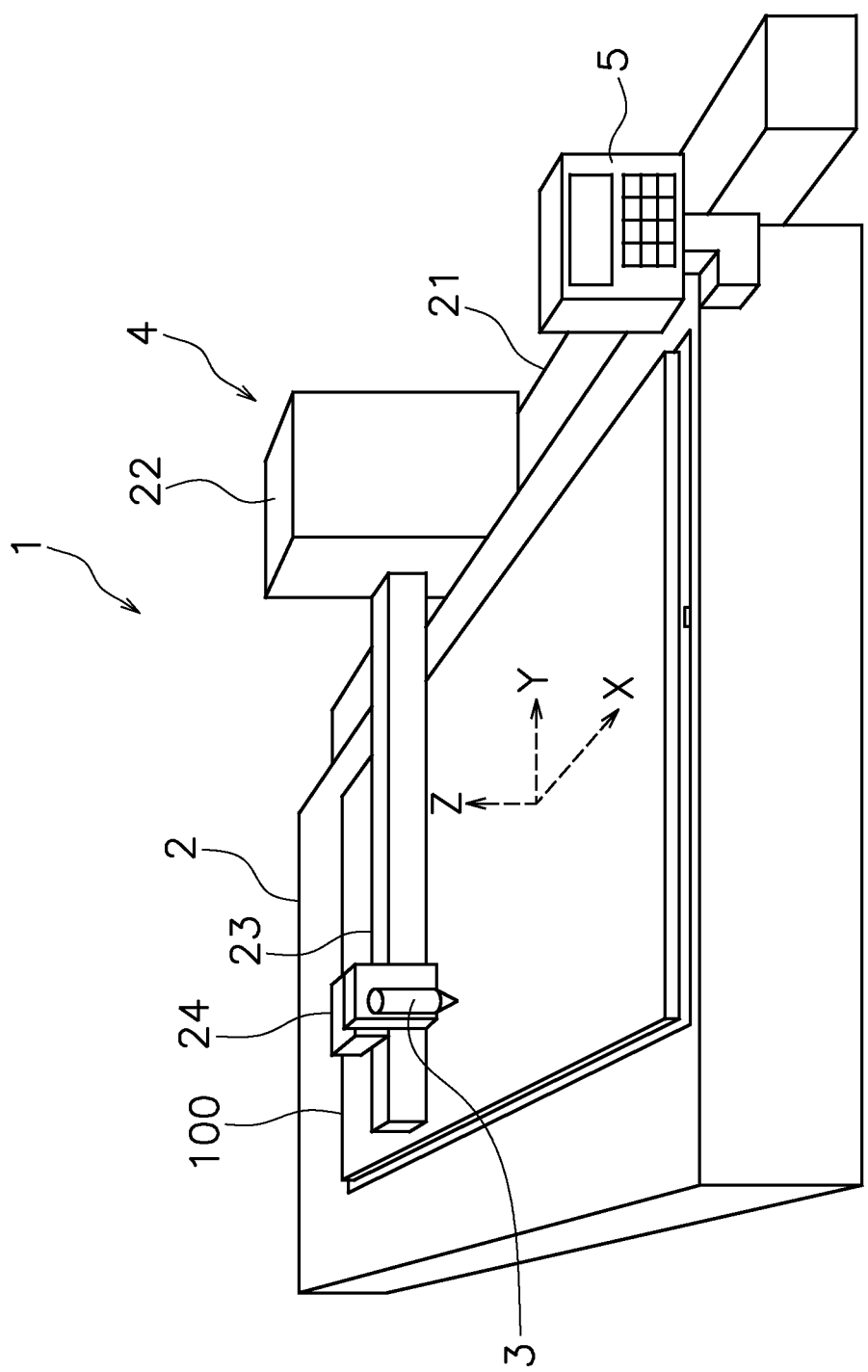
FIG. 1 is a perspective view of a plasma cutting machine according to an embodiment.

Embodiments of the present disclosure will be explained in detail with reference to the figures. FIG. 1 is a perspective view of a plasma cutting machine 1 according to the present embodiment. The plasma cutting machine 1 includes a table 2, a plasma torch 3, an actuator 4, and an input device 5. A material 100 such as a steel plate is placed on the table 2. The table 2 supports the material 100 to be cut. The plasma torch 3 is disposed above the table 2. The plasma torch 3 emits a plasma arc.

Figure 2:
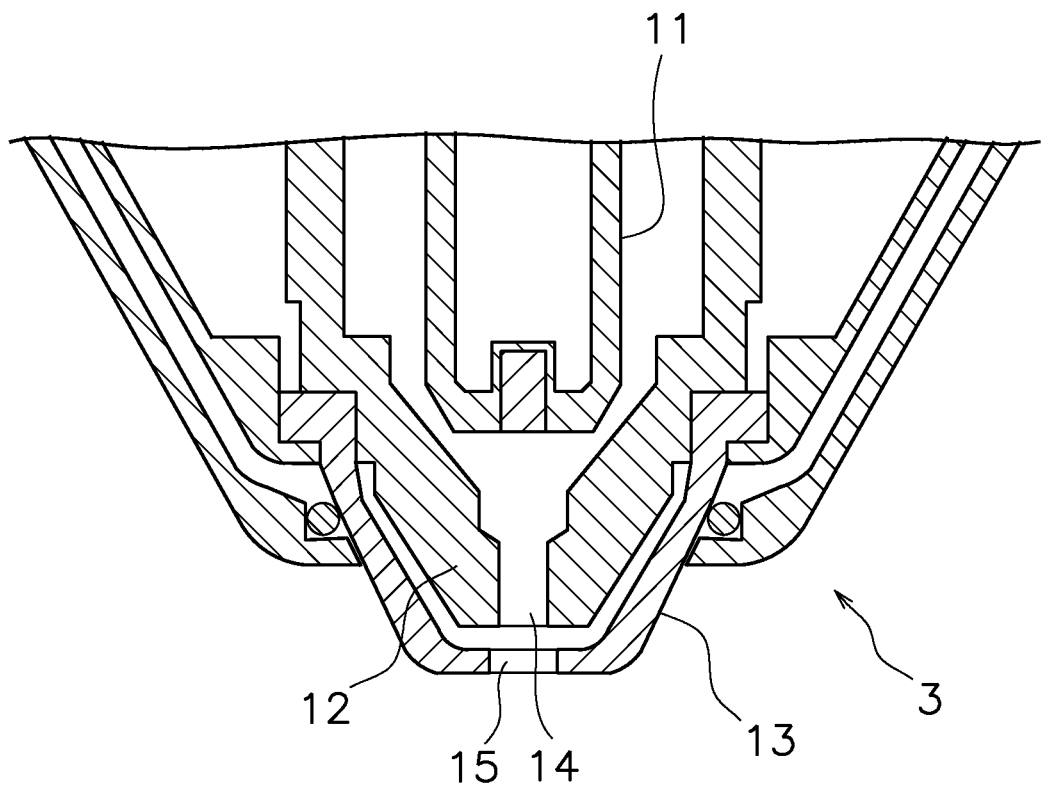
FIG. 2 is a cross-sectional view illustrating a portion of a plasma torch.

FIG. 2 is a cross-sectional view illustrating a portion of the plasma torch 3. As illustrated in FIG. 2, the plasma torch 3 includes an electrode 11, a nozzle 12, and a shield cap 13. The tip end of the electrode 11 is disposed inside the nozzle 12. The nozzle 12 includes an emission hole 14. The emission hole 14 of the nozzle 12 faces the tip end of the electrode 11. The shield cap 13 covers the nozzle 12. The shield cap 13 includes an emission hole 15 that faces the emission hole 14 of the nozzle 12. The plasma torch 3 generates a plasma arc by means of an arc discharge between the electrode 11 and the material 100.

The actuator 4 supports the plasma torch 3 so that the plasma torch 3 is able to move in the horizontal direction and the vertical direction with respect to the table 2. As illustrated in FIG. 1, the actuator 4 includes a first linear guide 21, a first carriage 22, a second linear guide 23, and a second carriage 24. The first linear guide 21 is disposed at the side of the table 2. The first linear guide 21 extends in an X-axis direction. The second linear guide 23 is disposed above the table 2. The second linear guide 23 extends in a Y-axis direction. In the present embodiment, the X-axis and the Y-axis are coordinates along the upper surface of the table 2. The X-axis and the Y-axis are orthogonal to each other and extend in the horizontal direction. A Z-axis is orthogonal to the upper surface of the table 2 and extends on the vertical direction.

The first carriage 22 is movable in the X-axis direction along the first linear guide 21. The second linear guide 23 is supported by the first carriage 22. The second carriage 24 is movable in the Y-axis direction along the second linear guide 23. The plasma torch 3 is attached to the second carriage 24. The second carriage 24 supports the plasma torch 3 to be movable in the Z-axis direction.

Figure 3:
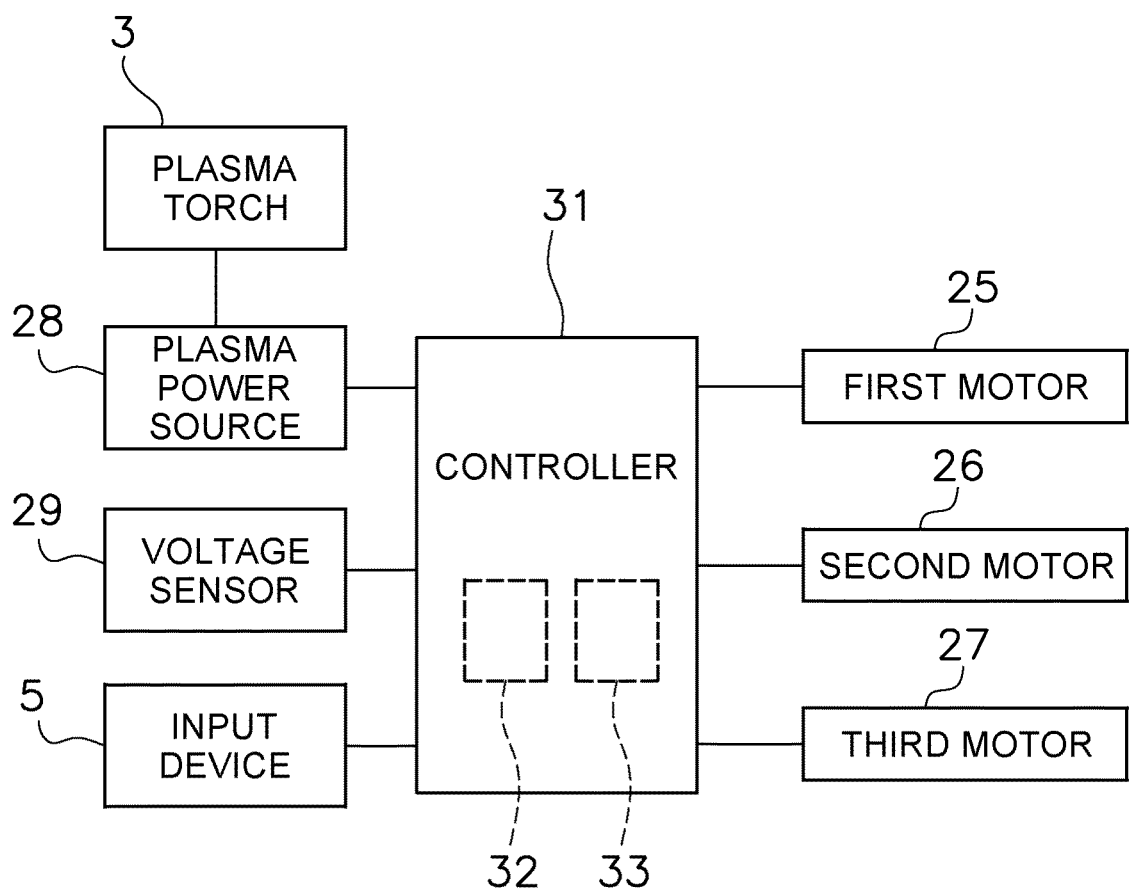
FIG. 3 is a block diagram illustrating a control system of the plasma cutting machine.

FIG. 3 is a block diagram illustrating a control system of the plasma cutting machine 1. As illustrated in FIG. 3, the plasma cutting machine 1 includes a first motor 25, a second motor 26, and a third motor 27. The first motor 25 causes the first carriage 22 to move along the first linear guide 21. The second motor 26 causes the second carriage 24 to move along the second linear guide 23. The third motor 27 causes the plasma torch to move up and down with respect to the second carriage 24. By driving the first to third motors 25 to 27, the actuator 4 moves the plasma torch 3 to desired positions in the horizontal direction (X-axis and Y-axis directions) and the vertical direction (Z-axis direction) with respect to the material 100 on the table 2.

As illustrated in FIG. 3, the plasma cutting machine 1 includes a plasma power source 28 and a voltage sensor 29. The plasma power source 28 is electrically connected to the plasma torch 3. The plasma power source 28 supplies electric power for generating the plasma arc, to the plasma torch 3. The plasma power source 28 includes, for example, a rectifier, an inverter, and a transformer. The voltage sensor 29 detects the arc voltage applied to the plasma torch 3 from the plasma power source 28. The voltage sensor 29 outputs a signal indicating the arc voltage. The input device 5 includes, for example, a plurality of input keys and a display. An operator uses the input device 5 to input data such as processing conditions. The input device 5 outputs signals indicating the inputted data.

As illustrated in FIG. 3, the plasma cutting machine 1 includes a controller 31. The controller 31 is programmed to control the plasma cutting machine 1 based on acquired data. The controller 31 includes a storage device 32 and a processor 33. The storage device 32 includes a non-volatile memory such as a ROM and a volatile memory such as a RAM. The storage device 32 may include an auxiliary storage device such as a hard disk or a solid state drive (SSD). The storage device 32 is an example of a non-transitory computer-readable recording medium. The storage device 32 stores computer commands and data for controlling the plasma cutting machine 1.

The processor 33 may be, for example, a central processing unit (CPU). The processor 33 executes processing for controlling the plasma cutting machine 1 in accordance with a program. The controller 31 communicates with the first to third motors 25 to 27, the plasma power source 28, and the voltage sensor 29. The controller 31 moves the plasma torch 3 by controlling the first to third motors 25 to 27. The controller 31 causes the plasma torch 3 to generate a plasma arc by controlling the plasma power source 28. The controller 31 cuts the material 100 by causing the plasma torch 3 to be moved while maintaining the plasma arc in the plasma torch 3.

Figure 4:
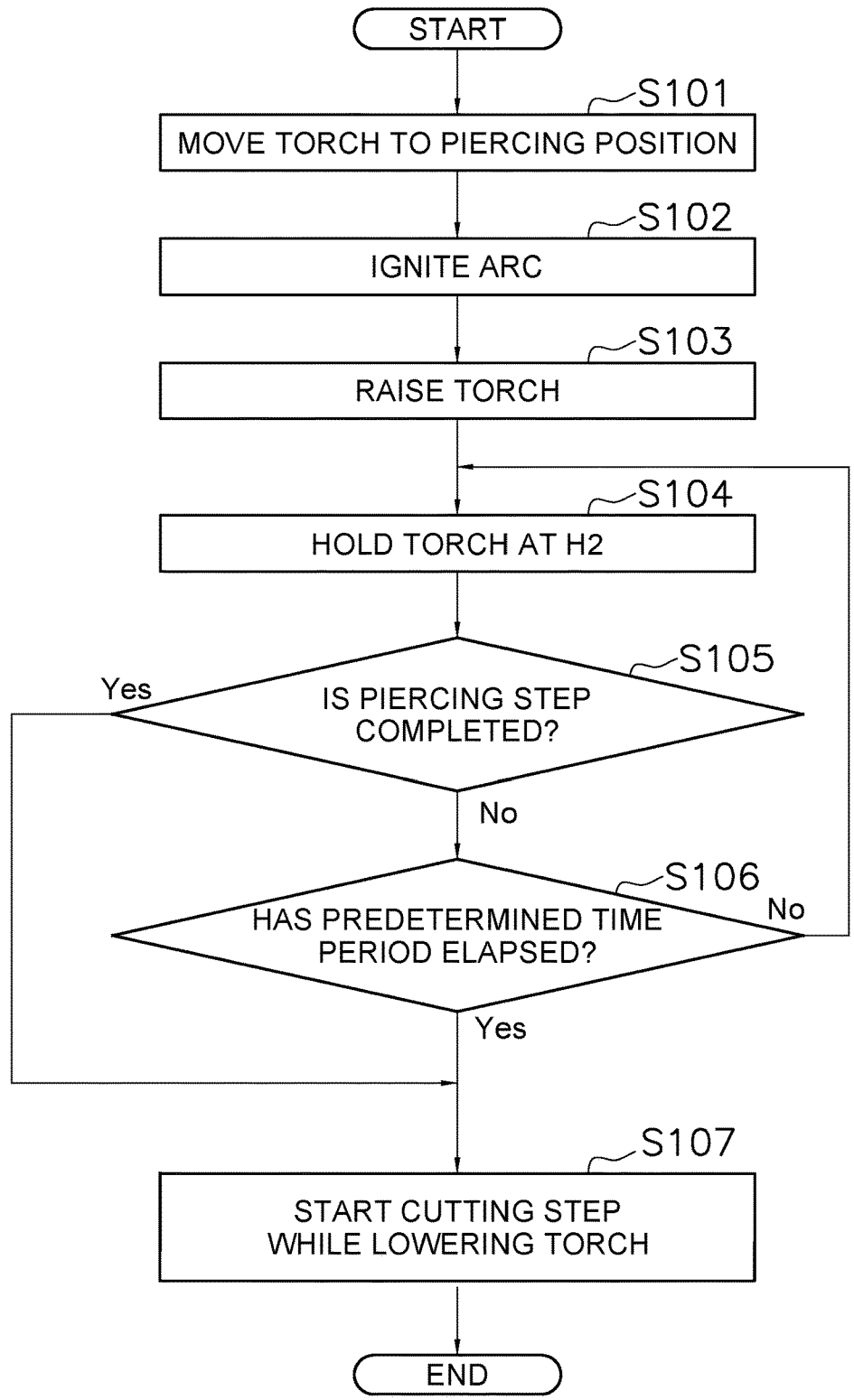
FIG. 4 is a flow chart illustrating processing for controlling the plasma cutting machine.

Next, the processing of machining by the plasma cutting machine 1 executed by the controller 31 will be explained. During machining by the plasma cutting machine 1, firstly a pierced hole is formed in the material 100 in a piercing step. A product is then cut out from the material 100 in a cutting step. FIG. 4 is a flow chart illustrating processing for controlling the plasma cutting machine 1.

Figure 5:
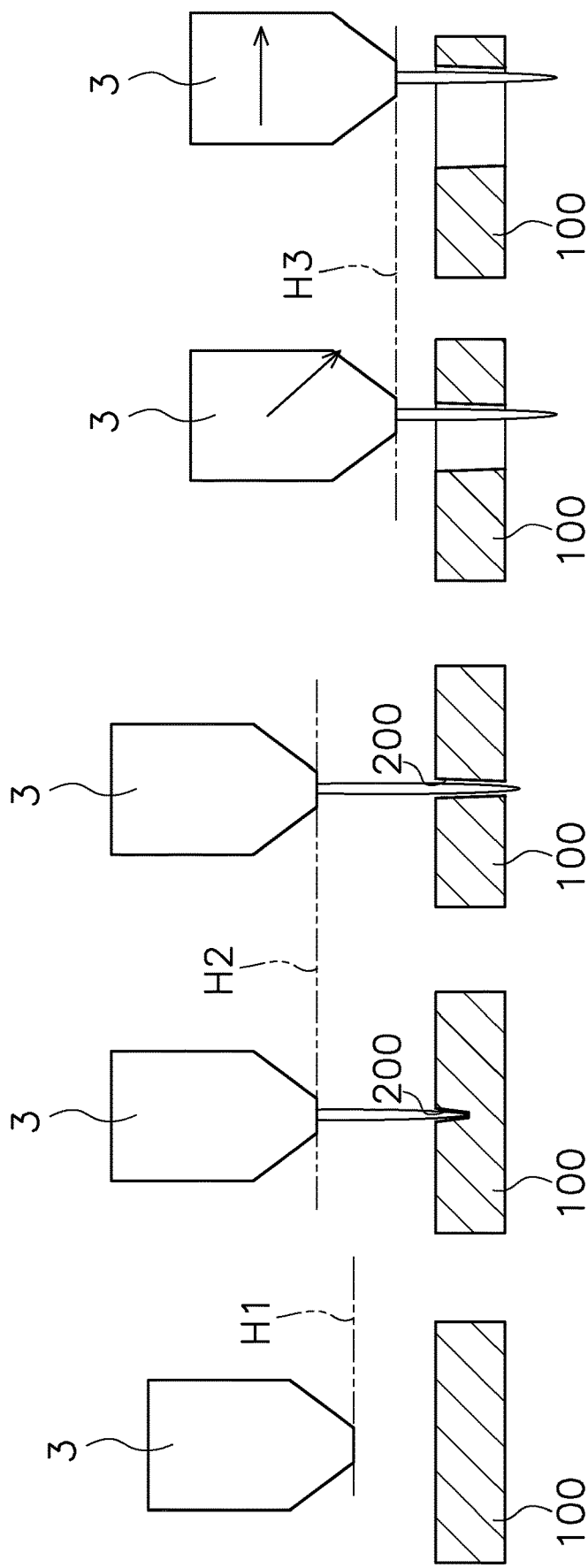
FIG. 5A, FIG. 5B, FIG. 5C, FIG. 5D and FIG. 5E are schematic views illustrating positions of the plasma torch.

As illustrated in FIG. 4, when the machining performed by the plasma cutting machine 1 is started, the controller 31 moves the plasma torch 3 to a piercing position in step S101. The piercing position is a position in the horizontal direction on the table 2 and is represented by XY-coordinates. FIG. 5A, FIG. 5B, FIG. 5C, FIG. 5D and FIG. 5E are schematic views illustrating positions of the plasma torch 3. As illustrated in FIG. 5A, the controller 31 disposes the plasma torch 3 at a first height H1 at the piercing position.

Figure 6:
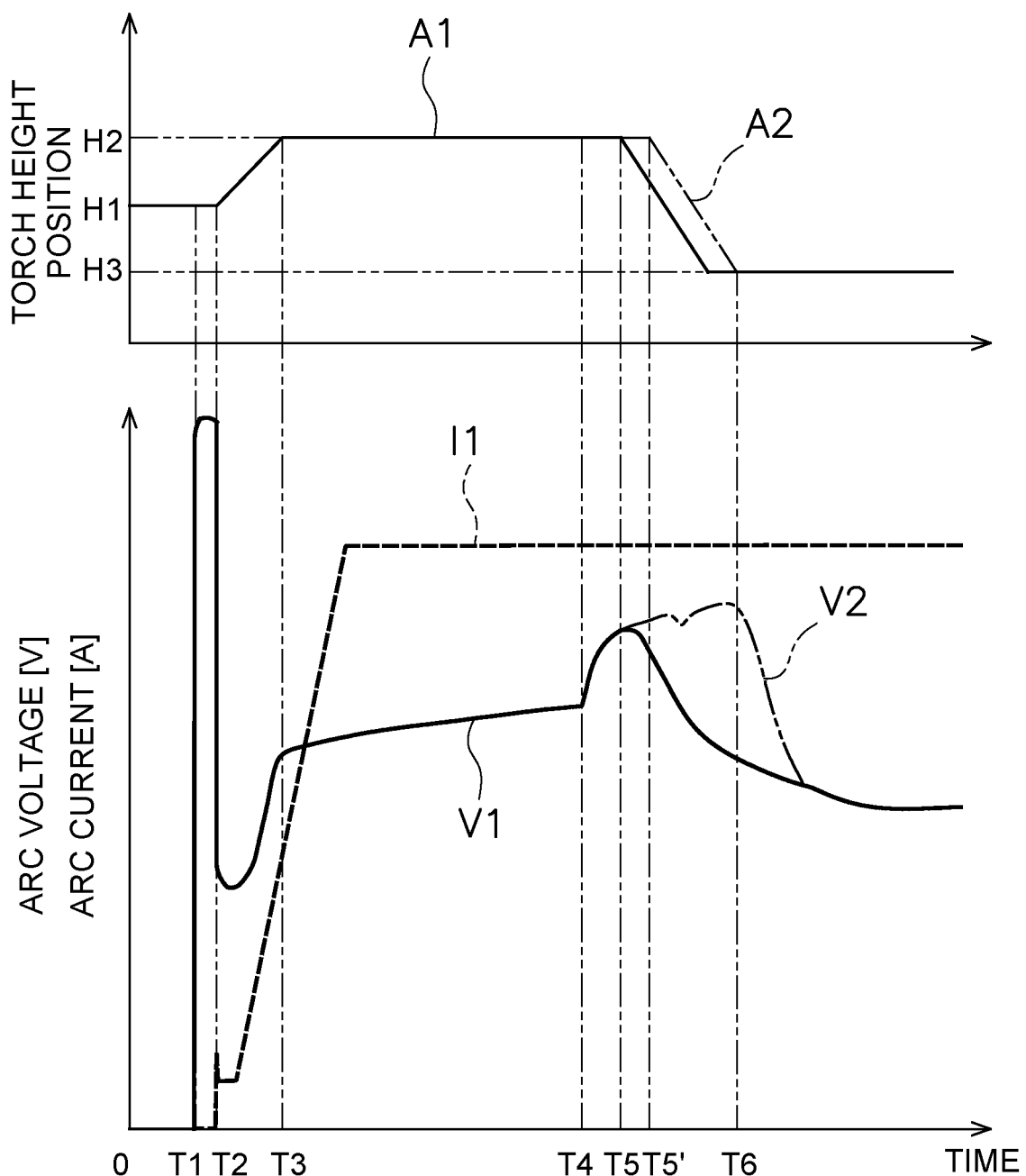
FIG. 6 illustrates an example of changes in the arc current and the arc voltage and changes in the height of the plasma torch.

In step S102, the controller 31 ignites the plasma arc in the plasma torch 3. Consequently, the controller 31 starts the piercing step. FIG. 6 illustrates an example of changes in the arc current and the arc voltage and changes in the height of the plasma torch 3. In FIG. 6, the solid line A1 represents changes in the height of the plasma torch 3, the dashed line I1 represents the arc current, and solid line V1 represents the arc voltage. As illustrated in FIG. 6, at the time T1, the controller 31 applies a high voltage to the electrode 11 of the plasma torch 3. Consequently, the plasma arc is generated in the plasma torch 3. By generating the plasma arc, the arc voltage drops at the time T2.

Next in step S103, the controller 31 raises the plasma torch 3. As illustrated in FIG. 5A, FIG. 5B, FIG. 5C, FIG. 5D and FIG. 5E, the controller 31 raises the plasma torch 3 to a second height H2 at the piercing position. The second height H2 is positioned higher than the first height H1. As illustrated in FIG. 6, the controller 31 raises the plasma torch 3 during the period from time T1 to time T3. Consequently, the arc voltage increases.

In step S104, the controller 31 holds the plasma torch 3 at the second height H2 at the piercing position. Consequently, as illustrated in FIG. 5B, a pierced hole is formed in the material 100 due to the plasma arc. At the time, sputter splashes from the material 100 but the collision of sputter on the plasma torch 3 is avoided due to the plasma torch 3 being positioned at the second height H2. In FIG. 6, a pierced hole 200 is formed in the material 100 during the period from times T3 to T4. At this time, the arc voltage increases in accompaniment to the extension of the pierced hole 200.

In step S105, the controller 31 determines whether the piercing step has been completed. The controller 31 determines whether the piercing step has been completed based on the arc voltage. Specifically, the controller 31 acquires the rate of increase per unit of time of the arc voltage. The controller 31 calculates the rate of increase per unit of time of the arc voltage from detection values of the voltage sensor 29. The controller 31 determines that the piercing step has been completed when the rate of increase is equal to or greater than a threshold. As illustrated in FIG. 5C, the piercing step is completed when the pierced hole 200 has passed through the material 100. When the pierced hole 200 passes through the material 100, the plasma arc becomes stretched. Consequently, the arc voltage increases sharply in the period from times T4 to T5 in FIG. 6. The controller 31 determines that the piercing step has been completed by detecting the sharp increase in the arc voltage at this time.

The controller 31 disables the determination of the completion of the piercing step during a predetermined time period from the starting time point of the generation of the plasma arc. Consequently, a false determination of the completion of the piercing step due to an increase in the voltage when generating the plasma arc during the period from times T1 to T3 in FIG. 6 can be prevented.

If the controller 31 has determined that the piercing step has not been completed in step S105, the processing advances to step S106. In step S106, the controller 31 determines whether a predetermined time period from the start of the piercing step has elapsed. The predetermined time period may be set for each cutting condition. Alternatively, the predetermined time period may be a fixed value. If the predetermined time period from the start of the piercing step has not elapsed, the processing returns to step S104. That is, the controller 31 holds the plasma torch 3 at the second height H2 at the piercing position until the piercing step has been completed or until the predetermined time period from the start of the piercing step has elapsed. When the controller 31 has determined that the piercing step is complete in step S105, or when the controller 31 has determined that the predetermined time period from the start of the piercing step has elapsed in step S106, the processing advances to step S107.

In step S107, the controller 31 starts the cutting step while lowering the plasma torch 3. As illustrated in FIG. 5D, the controller 31 moves the plasma torch 3 in the horizontal direction following a target track while lowering the plasma torch 3 to a third height H3. The third height H3 is lower than the second height H2. The third height H3 is lower than the first height H1. After the plasma torch 3 has reached the third height H3, as illustrated in FIG. 5E, the controller 31 moves the plasma torch 3 in the horizontal direction following the target track while holding the height of the plasma torch 3 at the third height H3. The target track is decided by the controller 31 in accordance with a previously set target shape of the product. The plasma torch 3 moves along the target track whereby the product is cut out from the material 100. The aforementioned piercing position, the first to third heights H1 to H3, and the target shape of the product are saved in the storage device 32.

In the plasma cutting machine 1 according to the present embodiment explained above, the controller 31 determines the completion of the piercing step based on the arc voltage. As a result, the completion of the piercing step can be determined more accurately in comparison to when the completion of the piercing step is determined based on an estimated time period until the completion of the piercing step. Consequently, the time period of the piercing step is shortened whereby an increase in the arc voltage due to the enlargement of the pierced hole 200 can be suppressed.

In addition, in the plasma cutting machine 1 of the embodiment, the controller 31 moves the plasma torch 3 quickly in the horizontal direction while the plasma torch 3 is being lowered after the completion of the piercing step. As a result, the enlargement of the pierced hole 200 can be suppressed in comparison to a case in which the plasma torch 3 is lowered while being held at the piercing position after the completion of the piercing step. Consequently, an increase in the arc voltage can be suppressed. While the voltage increases sharply at the time T1 in FIG. 6, an increase in the power supply capacity can be avoided because the current is small. Accordingly, the power supply capacity of the plasma power source 28 for preparing for the increase in the arc voltage due to the piercing step can be kept to a lower amount in the plasma cutting machine 1 according to the present embodiment. Alternatively, if the power supply capacity is the same, the arc voltage can be suppressed whereby the arc current can be increased. Consequently, the cutting performance of the plasma cutting machine 1 can be improved while suppressing an increase in the power supply capacity.

The chain double-dashed line A2 in FIG. 6 represents a change in the height of the plasma torch 3 according to a comparative example, and the chain double-dashed line V2 represents an arc voltage according to the comparative example. In the comparative example, the controller lowers the plasma torch straight down after a predetermined time period from the start of the piercing step. The controller then stops the lowering of the plasma torch at a predetermined height position and thereafter moves the plasma torch in the horizontal direction. In the comparative example, a predicted time from the start until the completion of the piercing step is set as the predetermined time period. Because the predicted time is estimated with a margin, as illustrated in FIG. 6, the lowering of the plasma torch starts at a time T5' that is later than the abovementioned time T5 in the comparative example. In addition, the plasma torch is lowered straight down and thereafter moves in the horizontal direction in the comparative example. As a result the maximum voltage of the arc voltage is greater as indicated by V2 in FIG. 6. In contrast, in the example according to the present embodiment, the maximum voltage of the arc voltage is limited to a lower voltage as indicated by V1 in FIG. 6. Consequently, the cutting performance of the plasma cutting machine 1 can be improved while suppressing an increase in the power supply capacity.

Even if the controller 31 determines that the piercing step has not been completed based on the arc voltage, the controller 31 moves the plasma torch 3 in the horizontal direction while lowering the plasma torch 3 when the controller 31 determines that the predetermined time period from the start of the piercing step has elapsed. As a result, even if the increase of the arc voltage at the time of penetration is made smaller due to the cutting conditions and whereby a change in the arc voltage as described above cannot be detected, the increase in the arc voltage can be suppressed.

The controller 31 determines that the piercing step is completed based on the rate of increase per unit of time of the arc voltage. Consequently, the effects produced by differences in the cutting conditions such as the height of the welding torch in the piercing step or the value of the arc current, are suppressed, and the completion of the piercing step can be determined accurately.

Although an embodiment of the present invention has been described so far, the present invention is not limited to the above embodiment and various modifications may be made within the scope of the invention. For example, the configuration of the plasma torch 3 may be changed. The configuration of the actuator 4 may be changed. The above-mentioned processing by the controller 31 may be changed or supplemented. A portion of the processing by the controller 31 may be omitted. The execution sequence of the processing by the controller 31 may be changed.

The method for determining the completion of the piercing step may be changed. For example, the completion of the piercing step may be determined when the arc voltage is equal to or greater than a predetermined threshold. The controller 31 in the above embodiment moves the plasma torch 3 in the horizontal direction while lowering the plasma torch 3 after the completion of the piercing step. However, the controller 31 may move the plasma torch 3 in the horizontal direction after the completion of the piercing step.

What is claimed is:

1. A plasma cutting machine for cutting a material with a plasma arc, the plasma cutting machine comprising:
    a table that supports the material;
    a plasma torch including an electrode;
    a plasma power source connected to the plasma torch;
    an actuator that supports the plasma torch to be movable horizontally with respect to the table and vertically respect to the table;
    a voltage sensor that detects an arc voltage applied to the plasma torch from the plasma power source; and
    a controller that communicates with the plasma power source, the actuator, and the voltage sensor, the controller being configured to
        move the plasma torch to a piercing position above a cutting starting position of the material,
        cause the plasma torch to generate a plasma arc and start a piercing step while the plasma torch is at the piercing position, the plasma torch being held at the piercing position without moving horizontally during the piercing step,
        determine whether the piercing step is completed based on the arc voltage, and
        move the plasma torch in a predetermined direction including at least a horizontal direction, after the piercing step is completed,
    the controller being further configured to disable determination of the completion of the piercing step during a predetermined time period from a starting time point of the generation of the plasma arc.

2. The plasma cutting machine according to claim 1, wherein
    the controller is configured to execute the move of the plasma torch in the predetermined direction to further include lowering the plasma torch after the piercing step is completed.

3. The plasma cutting machine according to claim 1, wherein
    the controller is further configured to
        acquire a rate of increase per unit of time of the arc voltage, and
        determine that the piercing step is completed when the rate of increase is equal to or greater than a threshold.

4. A plasma cutting machine for cutting a material with a plasma arc, the plasma cutting machine comprising:
    a table that supports the material;
    a plasma torch including an electrode;
    a plasma power source connected to the plasma torch;
    an actuator that supports the plasma torch to be movable horizontally with respect to the table and vertically respect to the table;
    a voltage sensor that detects an arc voltage applied to the plasma torch from the plasma power source; and
    a controller that communicates with the plasma power source, the actuator, and the voltage sensor, the controller being configured to
        move the plasma torch to a piercing position above a cutting starting position of the material,
        cause the plasma torch to generate a plasma arc and start a piercing step while the plasma torch is at the piercing position, the plasma torch being held at the piercing position without moving horizontally during the piercing step,
        determine whether the piercing step is completed based on the arc voltage, and
        move the plasma torch in a predetermined direction including at least a horizontal direction, after the piercing step is completed,
    the controller being further configured to execute the move of the plasma torch in the predetermined direction when a predetermined time period has elapsed after the start of the piercing step even if the controller determines that the piercing step has not been completed based on the arc voltage.

5. A method for controlling a plasma cutting machine that includes a plasma torch for cutting a material with a plasma arc, a table for supporting the material, a plasma power source connected to the plasma torch, an actuator configured to support the plasma torch to be movable horizontally and vertically with respect to the table, a voltage sensor that detects an arc voltage applied to the plasma torch from the plasma power source, and a controller, the method comprising using the controller to communicate with the plasma torch power source, the actuator, and the voltage sensor so as to execute:
    moving the plasma torch to a piercing position above a cutting starting position of the material,
    causing the plasma torch to generate the plasma arc and starting a piercing step while the plasma torch is at the piercing position, the plasma torch being held at the piercing position without moving horizontally during the piercing step,
    acquiring the arc voltage applied to the plasma torch,
    determining whether the piercing step is completed based on the arc voltage, moving the plasma torch in a predetermined direction including at least a horizontal direction after the piercing step is completed, and disabling determination of the completion of the piercing step during a predetermined time period from a starting time point of the generation of the plasma arc.

6. The method according to claim 5, wherein
the moving the plasma torch in the predetermined direction includes moving the plasma torch in the horizontal direction while lowering the plasma torch after the piercing step is completed.

7. The method according to claim 5, further comprising:
acquiring a rate of increase per unit of time of the arc voltage, and
determining that the piercing step is completed when the rate of increase is equal to or greater than a threshold.

8. The method according to claim 5, wherein
the moving the plasma torch in the predetermined direction is executed when the predetermined time period has elapsed after the start of the piercing step even if it has been determined that the piercing step has not been completed based on the arc voltage.

9. The plasma cutting machine according to claim 4, wherein
the controller is configured to execute the move of the plasma torch in the predetermined direction to further include lowering the plasma torch after the piercing step is completed.

10. The plasma cutting machine according to claim 4, wherein
the controller is further configured to
acquire a rate of increase per unit of time of the arc voltage, and
determine that the piercing step is completed when the rate of increase is equal to or greater than a threshold.

* * * * *